United States Patent [19]

Massie

[11] Patent Number: 5,378,767

[45] Date of Patent: Jan. 3, 1995

[54] FIXED BED HYDROGENATION OF LOW MOLECULAR WEIGHT POLYDIENE POLYMERS

[75] Inventor: Stephen N. Massie, Spring, Tex.

[73] Assignee: Shell Oil Company, Houston, Tex.

[21] Appl. No.: 80,044

[22] Filed: Jun. 18, 1993

[51] Int. Cl.⁶ .................... C08F 8/04; C07C 5/02; B01J 23/40
[52] U.S. Cl. .................. 525/339; 525/332.8; 525/332.9; 525/333.1; 525/333.2; 525/338; 585/255; 585/273; 585/277; 502/327
[58] Field of Search .............. 585/277, 273, 255; 502/327; 525/338, 339, 332.8, 332.9, 333.1, 333.2

[56] References Cited

U.S. PATENT DOCUMENTS

| | | | |
|---|---|---|---|
| 3,370,010 | 2/1968 | Isaacson et al. | 525/338 |
| 3,459,814 | 8/1969 | Kovach et al. | 525/339 |
| 3,809,687 | 5/1974 | Allison et al. | 525/339 |
| 4,038,175 | 7/1977 | Bhasin | 208/144 |
| 4,122,023 | 10/1978 | Yasui et al. | 585/255 |
| 4,337,329 | 6/1982 | Kubo et al. | 525/339 |
| 4,452,951 | 6/1984 | Kubo et al. | 525/339 |
| 4,501,685 | 2/1985 | Thomson et al. | 502/167 |
| 4,560,817 | 12/1985 | Bobsein et al. | 585/277 |
| 4,629,767 | 12/1986 | Shyr et al. | 525/339 |
| 4,656,230 | 4/1987 | Shyr et al. | 525/338 |
| 5,028,665 | 7/1991 | Hucul | 525/339 |

FOREIGN PATENT DOCUMENTS

| | | |
|---|---|---|
| 0378104 | 1/1990 | European Pat. Off. . |
| 60-151-255-A | 8/1985 | Japan . |
| 03016-702-A | 1/1991 | Japan . |
| 03017-176-A | 1/1991 | Japan . |
| 2011911 | 10/1978 | United Kingdom . |
| 2061961 | 10/1980 | United Kingdom . |

*Primary Examiner*—Asok Pal
*Assistant Examiner*—P. Achutamurthy
*Attorney, Agent, or Firm*—Donald F. Haas

[57] ABSTRACT

A method for hydrogenating unsaturated low molecular weight polymers, preferably polydiene monool, diol and polyol polymers, which comprises contacting the polymers under hydrogenation conditions with hydrogen in the presence of a fixed bed heterogeneous catalyst which is comprised of platinum, palladium or a mixture of the two supported on an alpha alumina support.

2 Claims, No Drawings

FIXED BED HYDROGENATION OF LOW MOLECULAR WEIGHT POLYDIENE POLYMERS

BACKGROUND OF THE INVENTION

This invention relates to the hydrogenation of polymers formed by the polymerization of dienes. More specifically, the present invention relates to the use of a fixed bed heterogeneous hydrogenation catalyst to hydrogenate low molecular weight polydienes which may contain functional groups such as hydroxyls.

The polymerization of dienes such as butadiene or isoprene yields polymeric products which are unsaturated. This remaining olefinic unsaturation provides for a mode of polymer degradation from ultraviolet light, ozone or heat. The stability of the polymeric products is greatly enhanced if the olefinic unsaturation is removed by hydrogenation. Dispersed hydrogenation catalysts such as the nickel catalysts formed by the action of an alkyl aluminum on nickel compounds work well to hydrogenate these polymers. Removal of the metal residues from the polymer mixture after hydrogenation by washing the polymer with an aqueous solution of acid can be difficult and costly due to the emulsification of the polymer mixture with the aqueous acid. This difficulty in separation can be even more pronounced if the polymer chain link is relatively short (molecular weight less than about 10,000, and/or if the polymer has functional groups such as hydroxyls.

I have found that a fixed bed catalyst may be used to catalyze the hydrogenation of such short length polymers. This has the advantage of avoiding the need for the difficult and sometimes impossible process steps required to remove catalyst residues from the hydrogenated polymer.

SUMMARY OF THE INVENTION

The present invention provides a method for hydrogenating unsaturated low molecular weight polymers of conjugated dienes and/or vinyl aromatic hydrocarbons. The process comprises contacting the polymers under hydrogenation conditions with hydrogen in the presence of a fixed bed heterogeneous catalyst which is comprised of platinum, palladium or a mixture of the two supported on an alpha aluminum support. In another, most preferred embodiment of the present invention, unsaturated low molecular weight polydiene monool, diol and polyol polymers are hydrogenated in the presence of the fixed bed heterogenous catalyst described above. Surprisingly, it has been found that the specific catalyst system described herein is extremely selective towards the hydrogenation of such hydroxylated polydienes such that very little of the hydroxy functionality is lost during the hydrogenation process.

DETAILED DESCRIPTION OF THE INVENTION

Anionically polymerized polymers and copolymers of conjugated diolefins and alkenyl aromatic hydrocarbons are generally prepared by first contacting the monomer or monomers to be polymerized simultaneously or sequentially with an anionic polymerization initiator such as Group IA metals, their alkyls, amides, silanolates, napthalides, biphenols and anthracenyl derivatives. It is preferred to use an organo alkali metal (such as sodium or potassium) compound in a suitable solvent at a temperature within the range from about −50° C. to about 300° C., preferably at a temperature within the range from about 0° C. to about 100° C. Particularly effective anionic polymerization initiators are organo lithium compounds having the general formula:

$$RLi_n$$

where R is an aliphatic, cycloaliphatic, aromatic or alkyl-substituted aromatic hydrocarbon radical having from 1 to 20 carbon atoms and n is an integer of from 1 to 4. Such processes are well known and are described in U.S. Pat. No. 4,039,593 and U.S. Pat. No. Re. 27,145 which are herein incorporated by reference. The polymers can be made linear in structure or branched or they may be star polymers which have a plurality of polymer arms extending from a central core. Such polymers are well known as is their method of manufacture (see, for example, U.S. Pat. Nos. 3,231,635, 3,265,765 and 4,444,953 which are herein incorporated by reference).

The polymers hydrogenated according to the present invention may contain only one or more conjugated diolefins. Conjugated diolefins which may be polymerized anionically include those conjugated diolefins containing from about 4 to about 24 carbon atoms such as 1,3-butadiene, isoprene, piperylene, methylpentadiene, phenylbutadiene, 3,4-dimethyl-1,3-hexadiene, 4,5-diethyl-1,3-octadiene and the like. Isoprene and butadiene are the preferred conjugated diene monomers for use in the present invention because of their low cost and ready availability. Alkenyl aromatic hydrocarbons may be copolymerized with conjugated diolefins. Such alkenyl aromatic hydrocarbons include vinyl aryl compounds such as styrene, various alkyl-substituted styrenes, alkoxy-substituted styrenes, vinyl naphthalene, alkyl-substituted vinyl naphthalenes and the like.

It is well known that various functional groups may be added to the above polymers by various well known reaction techniques. For example, hydroxy functionality can be placed on one end of the conjugated diolefin polymer to create a monool or hydroxy functionality can be added at both ends of a conjugated diolefin polymer to create a diol. Also, additional hydroxy functionality can be added randomly or at the ends of a branched or star polymer to create a polyol.

In the preferred embodiment of this invention, the polymers hydrogenated according to the process described herein are low molecular weight conjugated diolefin (or diene) monools, diols or polyols. By low molecular weight, I mean polymers having a molecular weight of 10,000 or less. If the molecular weight is much higher than 10,000, then higher temperatures are required which result in the cracking of the polymer or the crosslinking of the polymer.

Molecular weights of linear polymers or unassembled linear segments of polymers such as mono-, di-, triblock, etc., arms of star polymers before coupling are conveniently measured by Gel Permeation Chromatography (GPC), where the GPC system has been appropriately calibrated. For polymers of the type described herein, the appropriate standard is a narrow molecular weight polystyrene standard. For anionically polymerized linear polymers, the polymer is essentially monodisperse and it is both convenient and adequately descriptive to report the "peak" molecular weight of the narrow molecular weight distribution observed. The peak molecular weight is usually the molecular weight of the main species shown on the chromatograph. For materials to be used in the columns of the GPC, styrene-divinyl benzene gels or silica gels are commonly used and are excellent materials. Tetrahydrofuran is an excellent solvent for polymers of the type described herein. Ultraviolet or refractive index detectors may be used.

Measurement of the true molecular weight of a coupled star polymer is not as straightforward or as easy to make using GPC. This is because the star shaped molecules do not separate and elute through the packed GPC columns in the same manner as do the linear polymers used for the calibration. Hence, the time of arrival at an ultraviolet or refractive index detector is not a good indicator of the molecular weight. A good method to use for a star polymer is to measure the weight average molecular weight by light scattering techniques. The sample is dissolved in a suitable solvent at a concentration less than 1.0 gram of sample per 100 milliliters of solvent and filtered using a syringe and porous membrane filters of less than 0.5 microns pour sized directly into the light scattering cell. The light scattering measurements are performed as a function of scattering angle, polymer concentration and polymer size using standard procedures. The differential refractive index (DRI) of the sample is measured at the same wave length and in the same solvent used for the light scattering. The following references are herein incorporated by reference:

1. *Modern Size-Exclusion Liquid Chromatography*, M. W. Yau, J. J. Kirkland, D. D. Bly, John Wiley and Sons, New York, N.Y., 1979.
2. *Light Scattering From Polymer Solutions*, M. B. Huglin, ed., Academic Press, New York, N.Y., 1972.
3. W. K. Kai and A. J. Havlik, *Applied Optics*, 12, 541 (1973).
4. M. L. McConnell, *American Laboratory*, 63, May, 1978.

The process of the present invention differs from the commonly commercially used process for hydrogenating polymers of conjugated dienes and/or vinyl aromatic hydrocarbons. The present process utilizes a heterogeneous catalyst which is contacted with the polymer in a fixed bed system. Such a system may be described by, for example, a bed of catalyst held in a vertical cylinder between two screens, and hydrogen and a solution of the polymer are pumped through the bed of catalyst, either upflow, downflow, or counter-current flow.

The heterogeneous catalyst of the present invention is comprised of platinum, palladium or a mixture of the two supported on an alpha aluminum support. As will be seen by reviewing the examples, it is very important that the support material be an alpha aluminum support. Such a support may be further described by an oxide of aluminum with a surface area less than 10 square meters per gram by the B. E. T. method. It is quite surprising that this specific group of heterogenous catalysts is capable of selectively hydrogenating the low molecular weight polydiene monools, diols and polyols without removing a significant number of the hydroxyl groups from those polymers. The examples show that this is not a characteristic of the nickel catalysts or all of the other Group VIII metal catalysts.

To hydrogenate them, the polymers described herein are contacted with hydrogen in the presence of the catalyst system in a fixed bed of the catalyst. Generally, the conditions of hydrogenation are a pressure of ambient to two hundred atmospheres and a temperature of ambient to 525° F., and preferably 30 to 100 atmospheres and 200°–500° F.

Low molecular weight polydiene monools, diols and polyols are useful in weatherable, hydrolytically stable sealants and coatings. They also can be used in adhesives and a variety of other applications which unsaturated polymers of this type are suitable for. The polymers hydrogenated according to the present invention would have the advantage of increased stability with respect to ultraviolet light, ozone or heat.

EXAMPLE I

A commercially available 2000 molecular weight polybutadiene diol polymer was used in the following hydrogenation experiments. In each case, 45 milliliters of the catalyst (as whole particles) were diluted to 50 milliliters with silicon carbide chips and loaded into a fixed bed micro reactor. The catalysts were activated by treatment with pure hydrogen at atmospheric pressure and a temperature of 400° F.

The investigation of each catalyst started with mild conditions and the severity of the reaction conditions were increased until the hydrogenation conversion was measured by off-line ozone titration. The reactor conditions included pressures of 600 and 1100 psig, liquid hourly space velocities of 0.33, 0.50 and 1.00, and temperatures of from 200° to 525° F. Temperatures above 525° F. have previously been shown to thermally cross-link the feed material and plug the reactor so it was felt that if significant hydrogenation did not occur at 525° F. then the catalyst would be of no use.

Both palladium and nickel catalysts were used in the experiments recorded in this example. The palladium catalysts were supported on Cabot wide pore alumina extrudate (1.0 percent palladium) wide pore silica spheres (1.0 percent palladium) and Norton 81880 alpha alumina spheres at both the 1.0 and 3.0 percent palladium levels. Nickel was evaluated at the 10.0 percent level supported on the wide pore silica spheres and on AK-200 bimodal gamma alumina cylindrical extrudate. Table 1 below summarizes the catalysts used in the various experiments. The results of these hydrogenation experiments are shown in Table 2 as well as the results of three other hydrogenation experiments (101, 102 and 103) which utilized palladium supported on springs, ruthenium supported on springs and palladium supported on silica, respectively.

TABLE 1

Catalysts Used in Study of Polybutadiene Diol Hydrogenation

| Expt. | Catalyst Metal | Carrier | Metal Loading Wt. % |
|---|---|---|---|
| 104 | Pd | Wide Pore Alumina | 1.0 |
| 105 | Pd | Silica | 1.0 |
| 106 | Pd | Alpha Alumina | 1.0 |
| 107 | Ni | Silica | 10.0 |
| 108 | Pd | Alpha Alumina | 1.0 |
| 109 | Ni | Bimodal Alumina | 10.0 |
| 110 | Pd | Alpha Alumina | 3.0 |

TABLE 2

Polybutadiene Diol Hydrogenation

| Expt. | Catalyst Metal | Catalyst Carrier | % Conv. | H2 PSIG | Temp °F. | Aromatics by GPC |
|---|---|---|---|---|---|---|
| 101 | Pd (0.1%) | Springs | 92.2 | 600 | 603 | Yes |
| 102 | Ru (0.1%) | Springs | 50.1 | 600 | 501 | Yes |
| 103 | Pd (0.1%) | Silica | 71.0 | 600 | 501 | Yes |
| 104 | Pd | Wide Pore Alumina | 92.8 | 600 | 501 | No |
| 105 | Pd | Silica | 67 | 600 | 500 | ND |
| 106 | Pd | Alpha Alumina | 96.5 | 600 | 400 | No |
| 107 | Ni | Silica | 97.5 | 600 | 525 | ND |
| 108(1) | Pd | Alpha Alumina | 96.5 | 1100 | 400 | No |
| (2) | | | 97.2 | 1100 | 425 | No |
| (3) | | | 98.1 | 1100 | 450 | No |
| 109 | Ni | Bimodal Alumina | 74.4 | 1100 | 502 | Yes |
| 110 | Pd | Alpha Alumina | 99.1 | 1100 | 425 | No |

ND = Not Determined

The goal of these experiments was to achieve a hydrogenation conversion of at least 98 percent at the least harsh conditions possible. 98 percent was chosen because it is the minimum level of conversion which would be acceptable in the finished product application.

Neither of the two 10 percent nickel catalysts were able to achieve the 98 percent hydrogenation goal. The catalyst supported on the bimodal alumina achieved 74 percent conversion at 500° F. (109) and the other supported on the wide pore silica (107) reached 97.5 percent at a temperature of 525° F.

The two catalysts supported on springs were not able to achieve this goal either. The palladium catalyst (101) did achieve 95 percent conversion but had a very high temperature of 600° F.

Neither of the two palladium catalysts supported on silica (103 and 105) were able to meet the goal. In fact, the highest percent conversion achieved was far below the goal for both of those experiments.

The 1 percent palladium catalysts supported on wide pore alumina were able to only achieve 92.8 percent conversion at 501° F. (104). All of the high conversion samples were cloudy as a result of the undesirable formation of water via dehydroxylation.

One percent palladium was supported on the alpha alumina support (106). At 60 psig, this catalyst was able to achieve the desired conversion of 98 percent at 450° F. and 0.33 liquid hourly space velocity, albeit with the formation of some aromatics (discussed below). The same catalyst was reloaded and run at 1100 psig and 0.33 velocity (108) and the same 450° F. was required to achieve the desired 98 percent conversion. In order to gain additional activity, the level of palladium on the alpha alumina carrier was increased to 3.0 percent (110). This increase in metal level resulted in a substantial increase in catalytic activities such that the desired hydrogenation conversion was attained at only 375° F. At 400° F., the conversion reached 99.1 percent.

Various hydrogenation products were submitted for gel permeation chromatography to determine if any carbon-carbon bond cleavage was occurring form smaller molecules. Surprisingly, it was established that a portion of the products from a number of the catalytic hydrogenations contained varying amounts of polymer molecules with aromaticity in the polymer backbone. This unusual reaction is similar to the platinum-catalyzed dehydrocyclization reaction to form aromatic compounds from aliphatic compounds. The most active catalysts, the palladium on the alpha alumina, did not produce any of the aromatic structures at the higher pressure of 1100 psig. Otherwise, the aromatic structure appeared, in general, to form at higher temperatures, lower hydrogen pressures and in the presence of high surface area support materials.

The results of this experiment show that palladium supported on alpha alumina will catalyze the desired hydrogenation of the olefinic double bonds in the polybutadiene diol polymer to meet the 98 percent conversion goal. This type of catalyst does not promote undesirable dehydrocyclization reaction to form aromatic structures in the polymer backbone. The catalysts which met the 98 percent olefinic double bond conversion goal and the temperature at which the goal was achieved are compared in Table 3. It is significant that the other catalysts described herein were unable to achieve that goal. Furthermore, the catalysts shown below in Table 3 were highly selective in that no detectable hydroxy functionality was lost during the hydrogenation process, as determined by NMR.

TABLE 3

Catalysts Achieving 98 Percent Conversion in Polybutadiene Diol Hydrogenation

| Expt. | Catalyst Metal | Catalyst Carrier | Metal Loading Wt. % | 98% Conv. Temp. °F. |
|---|---|---|---|---|
| 106 | Pd | Alpha Alumina | 1.0 | 435 |
| 108 | Pd | Alpha Alumina | 1.0 | 445 |
| 110 | Pd | Alpha Alumina | 3.0 | 375 |

EXAMPLE 2

Isoprene was anionically polymerized in the presence of an alkyl lithium initiator to form a lithium-contaminated 10 percent homopolyisoprene cement in cyclohexane. The polyisoprene had a molecular weight of 7000. The polymer was hydrogenated according to the procedure set forth in Example 1. A guard bed of water-impregnated alumina spheres was used to remove the lithium metal from the polymer before contact with the hydrogenation catalyst which was the 3 percent palladium supported on the alpha alumina support described in Example 1. The use of the guard bed is preferred when the polymer to be hydrogenated is contaminated with lithium metal left over from polymerization of the polymer. This process is described in detail in my co-pending application Ser. No. 920,694, filed Jul. 28, 1992 which has been allowed by the United States Patent and Trademark Office and which is herein incorporated by reference.

TABLE 4

Hydrogenation of Lithium-Contaminated
10 Percent Homopolyisoprene in Cyclohexane
(With Palladium on Alpha Alumina Catalyst)

| Temperature °F. | % Conversion Without Guard Bed | % Conversion With Guard Bed |
|---|---|---|
| 300 | 54 | |
| 320 | | 98.6 |
| 340 | | 99.7 |
| 350 | 69 | |
| 400 | 93 | |
| 450 | 96.0 (Degraded) | |
| 500 | 96.3 (Degraded) | |
| 550 | 98.4 (Degraded) | |

When the hydrogenation of the homopolyisoprene was attempted in the absence of the alumina-water guard bed, the desired 98-plus percent conversion of the olefinic bonds could not be achieved except at conditions so severe that degradation of the polymer occurred. When the hydrogenation was attempted with the guard bed in place, then the desired hydrogenation could be effected at much milder conditions where no polymer degradation was detected.

I claim:

1. A method for hydrogenating unsaturated low molecular weight polydiene monool, diol and/or polyol polymers which comprises contacting the polymers under hydrogenation conditions with hydrogen in the presence of a fixed bed heterogeneous catalyst which is comprised of platinum, palladium or a mixture of the two supported on an alpha alumina support.

2. A method for hydrogenating unsaturated low molecular weight polymers of conjugated dienes and/or vinyl aromatic hydrocarbons which comprises contacting the polymers under hydrogenation conditions with hydrogen in the presence of a fixed bed heterogeneous catalyst which is comprised of platinum, palladium or a mixture of the two supported on an alpha alumina support.

* * * * *